United States Patent [19]

Gunther

[11] Patent Number: 5,295,806
[45] Date of Patent: Mar. 22, 1994

[54] HOT RUNNER SYSTEM HAVING A BLOCK-SHAPED CASING

[75] Inventor: Herbert Gunther, Allendorf, Fed. Rep. of Germany

[73] Assignee: Dipl. -Ing. Herbert Gunther Gesellschaft mbh, Fed. Rep. of Germany

[21] Appl. No.: 883,012

[22] Filed: May 14, 1992

[30] Foreign Application Priority Data

May 14, 1991 [DE] Fed. Rep. of Germany ....... 9107154

[51] Int. Cl.$^5$ ............................................ B29C 45/00
[52] U.S. Cl. .................. 425/547; 264/297.2; 264/328.8; 425/570; 425/572
[58] Field of Search .............. 425/547, 567, 570, 572, 425/588; 264/297.2, 328.8

[56] References Cited

U.S. PATENT DOCUMENTS

| | | | |
|---|---|---|---|
| 3,091,812 | 6/1963 | Witkowski | 425/588 |
| 3,520,026 | 7/1970 | Stidham et al. | 425/572 |
| 4,761,343 | 8/1988 | Gellert | 425/570 |
| 4,964,795 | 10/1990 | Tooman | 425/567 |
| 5,032,078 | 7/1991 | Benenati | 425/570 |
| 5,147,663 | 9/1992 | Trakas | 425/567 |

*Primary Examiner*—Tim Heitbrink
*Attorney, Agent, or Firm*—Fred Philpitt

[57] ABSTRACT

A hot runner system (10) for injection molding which includes a block-shaped casing (12) with a bore (14) for facewise insertion of at least one cartridge-like unit (16) having a material flow tube (32) enclosed by a heating device (38), and by a thermoconductive casting (V), and opposite flow transfer openings (35, 36), there are radial supports (40) protruding over the outer diameter (D) of the cast body (30) with an engaging face that is recessed relative to the bore (14) and serves for form-fit to nozzles (11), further units (16), additional flow tubes (32), etc. the supporting element for the cast body (30) being symmetrically arranged in either axial direction to form hollow compartments, including thin spiders (49), ribs (50), supporting segments (51) and tube-type studs (68), axial abutting members (18, 19) providing for tight closure of the hot runner system (10).

13 Claims, 5 Drawing Sheets

HOT RUNNER SYSTEM HAVING A BLOCK-SHAPED CASING

Conventional runner systems comprise distributor or manifold blocks with built-in heating cartridges or tubular heating elements whose thermal insulation relative to the casing and/or to the injection molding unit is often insufficient. Consequently, heating the runner block necessitates rather large power input and quite long heating-up time. In addition, cleaning may be difficult in particular with interior heating systems.

A runner system in accordance with U.S. Pat. No. 3,091,812 comprises a heated material-supply tube encompassed by a T-shaped conductive tube engaging the tool block inside. The T-tube is welded at its ends to a steel plate which is not insulated relative to the supply tube, resulting in plenty of heat dissipation and correspondingly large energy loss. Moreover, there is an uncontrolled influence on the tool temperature. The unit is not suited or ill-equipped for cleaning which must be done by the factory with particular mechanical and chemical efforts; if production is to continue, a replacement unit is indispensable during maintenance activities.

In a similar hot runner system according to U.S. Pat. No. 3,520,026, the entire runner block must be heated, too, so that a steep decrease of temperature is inevitable at the plastics material transfer points. Forces due to the very high processing pressure must be steered around the block, increasing the design expenditures.

Another hot runner system as disclosed in EP 0 274 005 includes an independent unit comprising a plastics material supply tube as well as a heating device encompassed by a concentric sleeve. The unit is generally cylindrical and adapted for facewise insertion into or dismantling out of the associated casing relative to which it is thermally insulated by one or more separating means, A resistor band of special shape or a mains supply heating coil is used for electrical heating designed to dissipate less heat to the inner portions of the plastics material tube than to its ends. The sleeve has air gaps for thermal insulation underneath supporting rings. Outer insulating spaces adjacent to the casing are filled with solidified plastics during operation. It would be desirable to cut the expenditures required for both manufacture and assembly of the structure.

OBJECTS OF THE INVENTION

In order to satisfy the existing need for an advance, the invention aims at improving a hit runner system as mentioned above and more particularly a distributing or manifold system therefor such that is can be manufactured more economically and that its mechanical and thermal properties be considerably enhanced in a simple manner.

It is a special objective of the invention to create means for minimum heat transfer to the casing and for a high standard of electrical safety of the hot runner system.

Another object of the invention is to provide economical and convenient means for assembling, maintaining and cleaning the hot runner system.

Moreover, economical operation is to be warranted so that time and energy consumption be reduced as far as possible.

SUMMARY OF THE INVENTION

In a hot runner system that comprises a block-shaped manifold casing with at least one bore for facewise insertion of a cartridge-type unit having a material flow tube enclosed by a heating device, e.g. by an electric coil or a resistor band, and by a thermoconductive casting, the invention provides thin web-like spacers for supporting the cast body and/or the flow tube within the bore, and further provides radial supports which have, recessed relative to the bore, an engaging face each form-fit to other components such as nozzles, further units, additional flow tube, etc.

Thus the cast body is a component part that can easily be introduced into the casing bore and be fixed therein, under thermal separation, for convenient heating and distribution of the plastics material processed. The engaging faces of each radial support permit tight connection of further components with minimum heat dissipation towards the cooler casing. Owing to good thermal insulation, identical thermal conditions are warranted at each flow transfer opening so that a well-balanced temperature profile is achieved.

SPECIALIZATION OF THE INVENTION

Preferably the engaging faces of the radial supports are plane to facilitate tight attachment of any further component. Axially extended radial segments arranged diametrically opposite to each radial support will reliably receive the pressure of recoil during operation.

An important embodiment features radial supports which are thermoresistive for insulation relative to the thermoconductive parts including the casting so that from the latter, too, only minimum heat will be dissipated to the casing. The excellent performance will even be promoted by equal number of identical supports associated to each flow transfer point whereby well-defined constant thermal conditions are established throughout the system, in particular if these radial supports or further ones are arranged symmetrically to the flow transfer openings and if identical heating means are provided on either side of the flow inlet.

As to practical design, it is advantageous to provide axially spaced spiders for radially supporting the flow tube, e.g. by way of at least three narrow spokes in a star or cross configuration comprising a hub that is integral with or rigidly connected to the flow tube. Such supports are preferably thermoresistant. They have few and very small engaging faces through which heat may dissipate, and they provide wide gaps for comfortably lodging longitudinal bridges of the heating device that are thermoconductively fixed in the cast body.

Radial studs may be secured to the flow tube e.g. by a set screw or by welding for easy mounting of the flow tube or the cast body, respectively. Another mode of setting the flow tube is the use of externally engaging bolts, resting screws or the like, whereby later adjustment is facilitated. The invention also contemplates embodiments wherein the flow tube is fixed without clamping at its ends. Moreover, a plurality of flow outlets may be equipped with a fitting bush each for attaching a nozzle, said bush preferably having two bevels for close packing of adjacent nozzles.

BRIEF DESCRIPTION OF THE DRAWINGS

Further features, particulars and advantages of the invention will be apparent from the wording of the claims and from the following disclosure of preferred embodiments shown in the annexed drawings wherein:

DESCRIPTION

Figure 1:
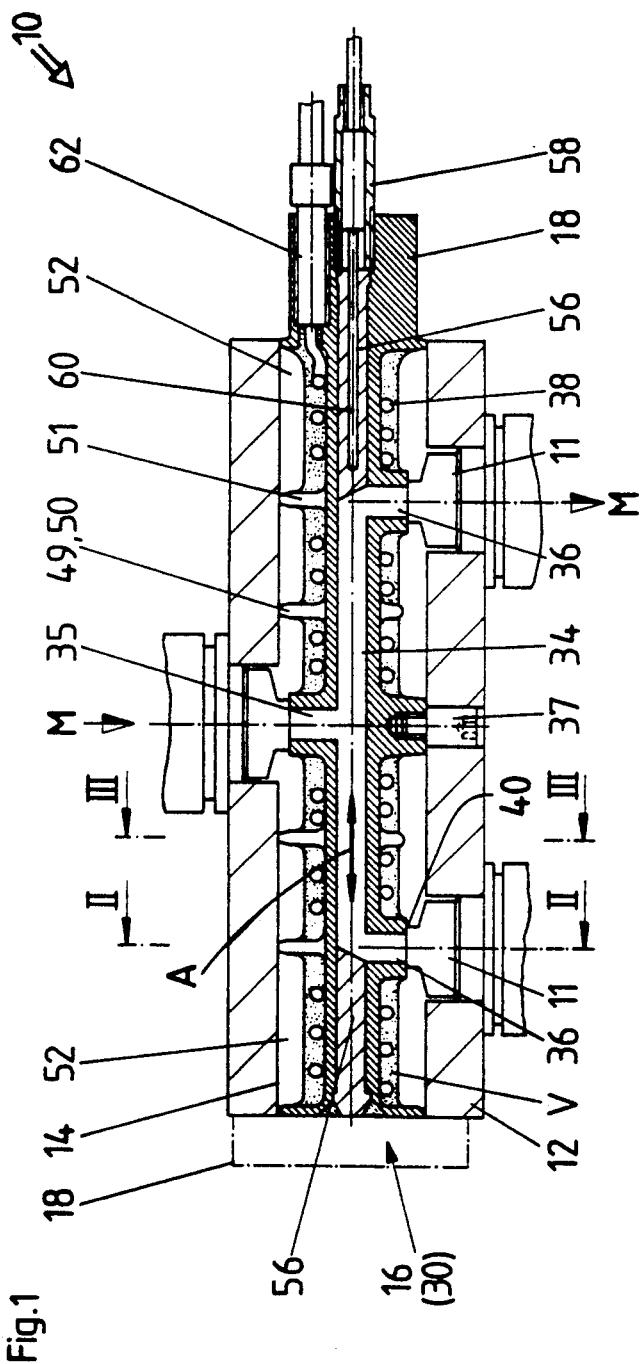
FIG. 1 is an axial sectional view of a hot runner system.

As seen in FIG. 1, a hot runner system designated as a whole by 10 includes a casing 12 having a bore 14 for receiving a cartridge-like unit 16. Abutting members 18 close the unit 16 on either axial end in the casing 12 the top of which comprises means for supplying plastics material fed through the system for injection out of nozzles 11 arranged below.

The cartridge-like unit 16 includes a cast body 30 with a flow tube 32 carrying an insulating layer 39 and a heating coil 38. Between the latter and an outer protective tube, an electrical insulation (not shown for reasons of clarity) may be provided.

A thermoconductive casting V, e.g. of or including aluminium, serves to positively bond the component parts at the outside. The flow tube 32 comprises a main runner 34 as well as flow transfer openings 36. At inlet point 35, the plastics material to be processed will enter the runner 34 form where it will be discharged through at least two flow outlets 36. The directions of material flow are designated by M in FIG. 1.

Figure 3:
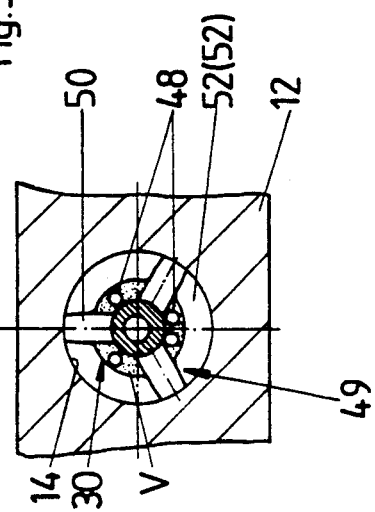
FIG. 3 is a cross section view along plane III—III of FIG. 1.
Figure 2:
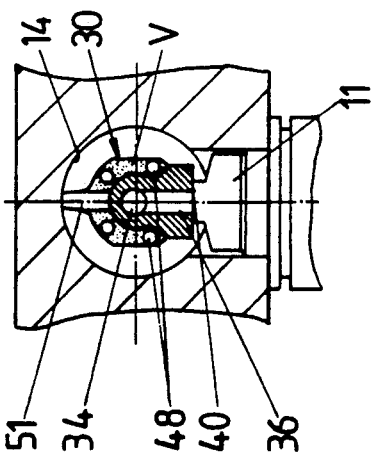
FIG. 2 is a cross section view along plane II—II of FIG. 1.

The flow tube 32 includes collar-type radial supports 40 (see FIGS. 2 and 5) in the region of the flow transfer points 36 (FIGS. 1 and 4) for full contact to joining faces of further components such as nozzles, branching elements, etc. Opposite to every radial support 40, there is a counteracting thin supporting segment 51 that preferably extends over some axial length. In addition, the cast body 30 comprises spiders 49 of star or cross configuration as well as ribs 50 having peripheral gaps so that they form narrow spokes (FIGS. 3 and 6). These further radial supports 49, 50, 51 snugly engage bore 14 from within. Due to their extremely small engaging faces because of their narrow shapes and also to the thermoresistive material used, which may be titanium, aluminium oxide ceramics or the like, very little heat is dissipated to the casing 12. Another inherent advantage of this design is the allowance for thermal expansion or shrinkage between the hot flow tube 32 and the casing 12 which remains rather cool during operation.

Outer hollows or clearances 52 are present between the individual supports 49, 50 for enhancing the thermal insulation of the cartridge-type unit 16 towards the casing 12. Owing to the close fit of the radial supports 40 and their engaging faces, these hollows 52 will remain free of processed plastics.

The gorges of the spiders 49 are adapted to receive longitudinal bridges 48 of the heating coil 38, namely connecting leads, and are also filled with the thermoconductive casting V for promoting heat transfer between the various portions of the heating coil 38 (see FIGS. 3 and 6).

Figure 4:
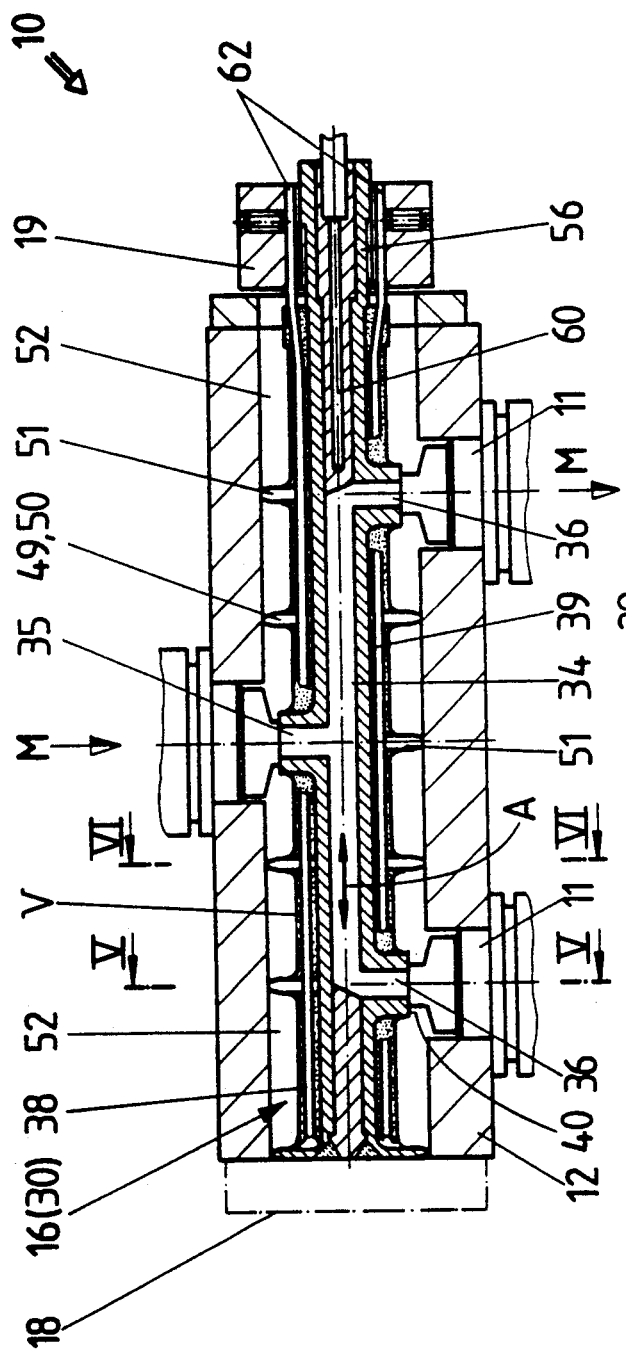
FIG. 4 is an axial sectional view of a modified hot runner embodiment.
Figures 5, 6:
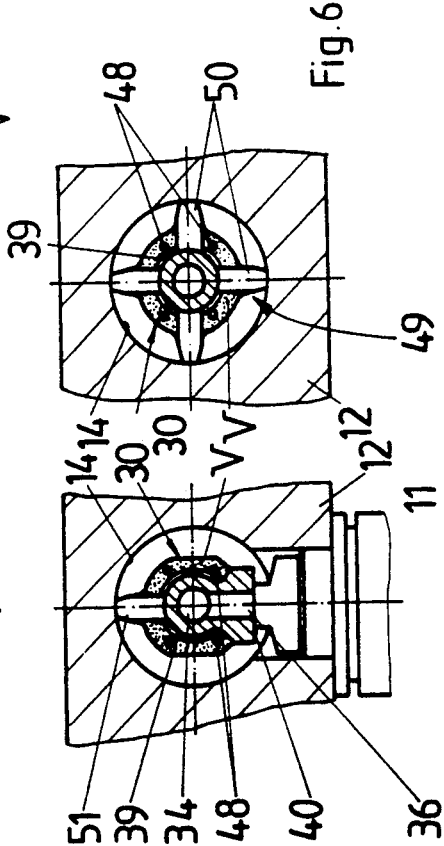
FIG. 5 is a cross section view along plane V—V of FIG. 4.
FIG. 6 is a cross section view along plane VI—VI of FIG. 4.

The casing 12 is closed at either face end by abutting members 18 (FIG. 1) or by a terminal ring 19 (FIG. 4). The main runner 34 is axially closed at either end by a deflecting plug 56 one of which (the righthand one in FIGS. 1 and 4) may contain a thermo-probe 60 held in a feed-in plug 58. Adjacent thereto, connectors 62 to the heating coil 38 can be easily attached. The cast body 30 is positioned relative to the material supply means (FIG. 1) by a central gripping bolt 37, preferably also with thermal insulation.

In the embodiment of FIG. 1, the electric coil 38 is designed for mains supply, e.g with a tension of 220 volts. By contrast, the design of FIG. 4 is destined for low-voltage operation in that the heating wire 48 extends longitudinally, i.e. in an axial direction A, and in that the flow tube 32 carries an electrical insulation layer 39 (schematically indicated). An alternative is the use of resistive bands or straps which, in a peripheral development view, may be meandering. The low-voltage heating elements are preferably non-insulated when applied to the insulating layer 39 of the flow tube 32, with subsequent electrical insulation prior to overcasting by the thermoconductive compound.

Figure 8:
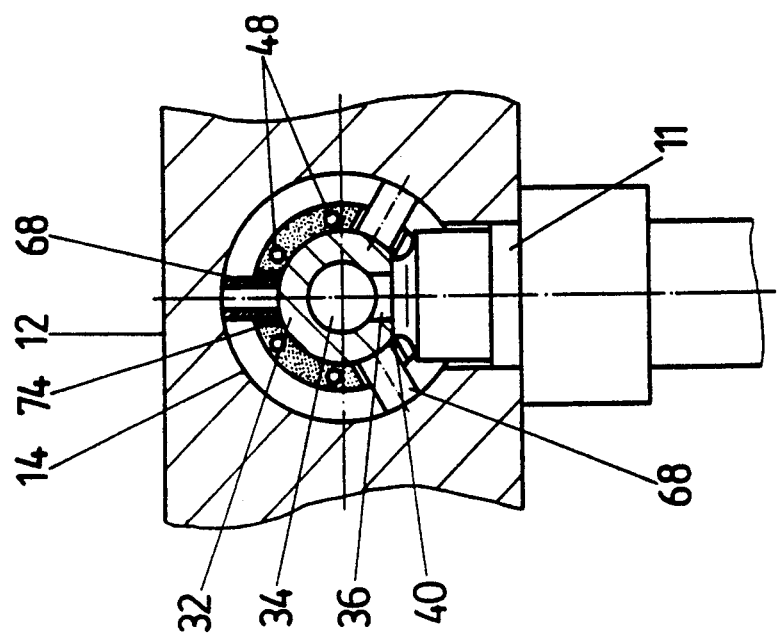
FIG. 8 is a cross section view along plane VIII—VIII of FIG. 7.
Figure 7:
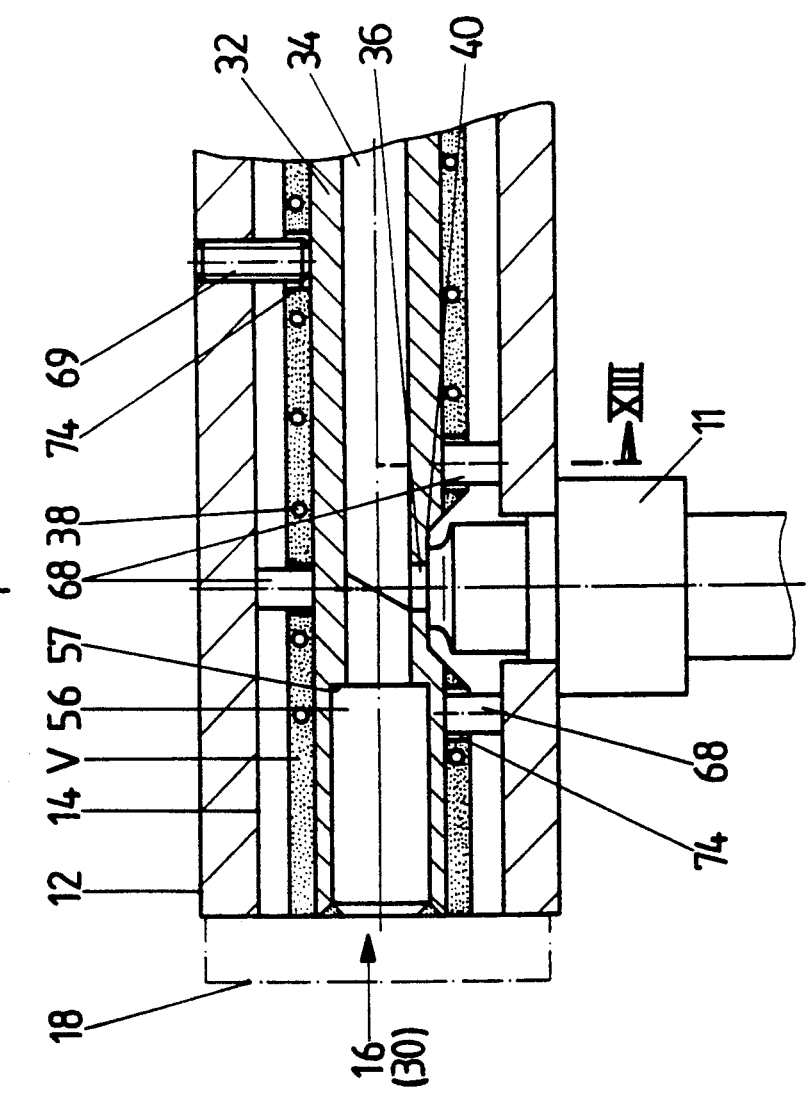
FIG. 7 is an enlarged portion of an axial sectional view of a hot runner end.

FIGS. 7 and 8 show one end of a principally similar hot runner system having a cartridge-type unit 16 fitted into bore 14 of casing 12, the flow tube 32 including in the direction towards abutting member 18 a shoulder 57 for the deflecting plug 56. A stud or pin 68 which may be tube-shaped and is thermo-insulated relative to the casting V serves for radial support of the flow tube 32, bearing onto the interior of bore 14. It will be evident from FIGS. 7 and 8 that a pair of such studs 68 may be provided on either side of nozzle 11 and another stud 68 opposite thereto so that a total of five tube-type radial supports is arranged at angles of 120° between them. They grab the flow transfer point 36 symmetrically and are preferably made of a low thermoconductivity material such as chrome-nickel steel. Alternatively, a set screw 69 may be employed in order to support and position the flow tube 32 at an intermediate point, expediently with an insulating ring 74. It will be noted that these pins or studs—whether solid or tube-like—as well as further supports may be offset both radially and axially, in particular in symmetrical arrangements.

Figure 10:
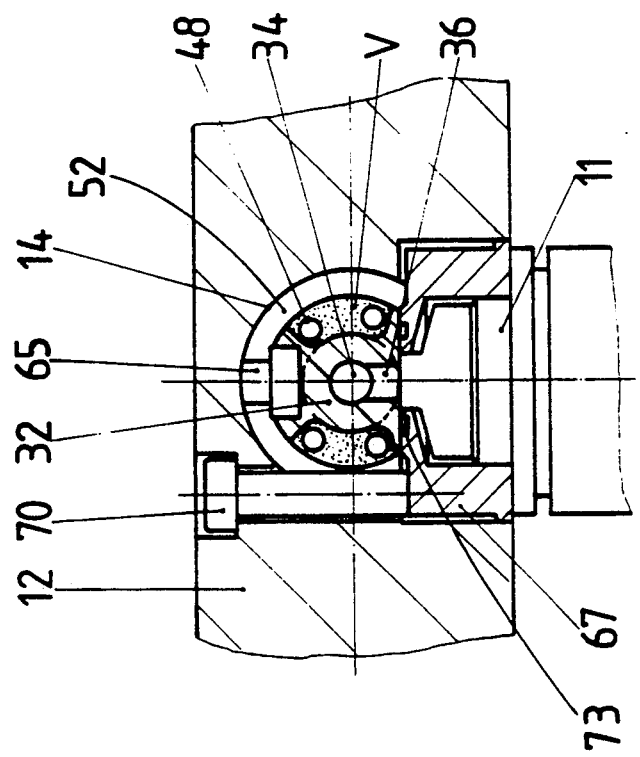
FIG. 10 is a cross section view along plane X—X of FIG. 9
Figure 9:
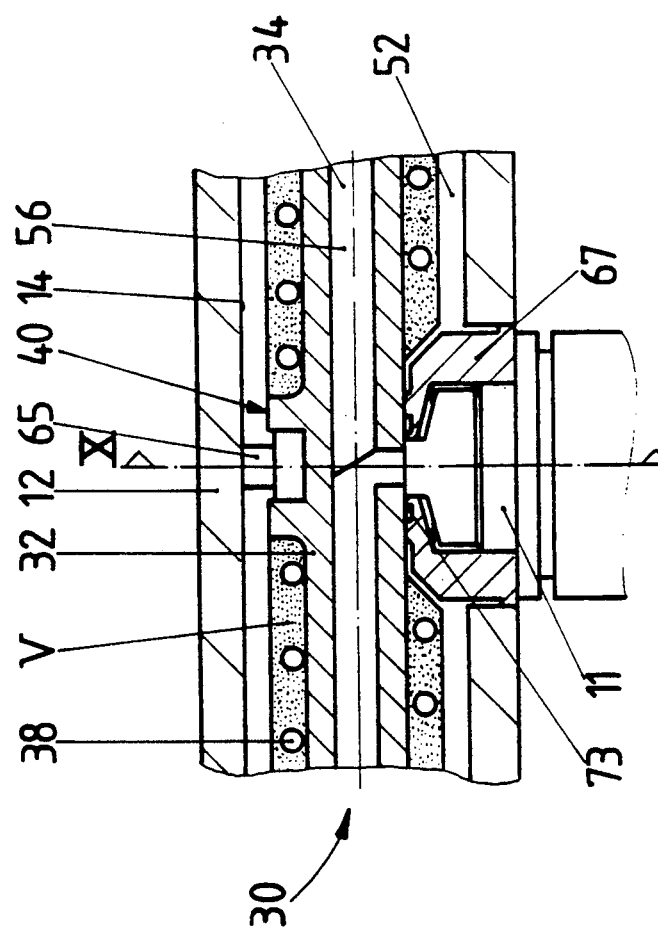
FIG. 9 is an axial sectional view showing part of another hot runner embodiment.
Figure 11:
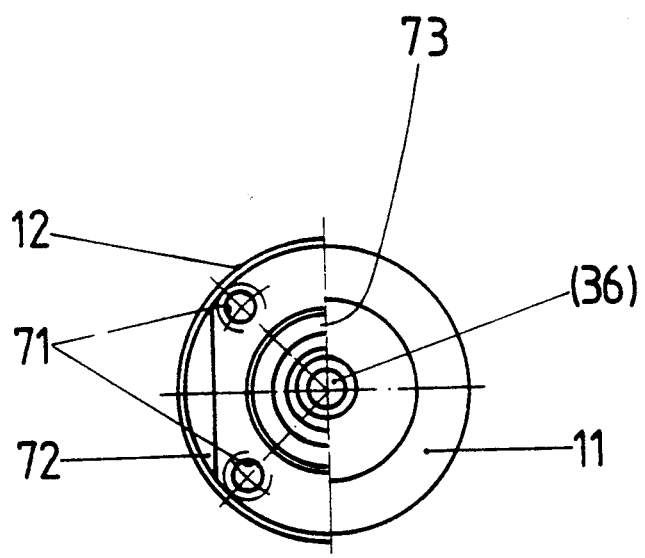
FIG. 11 is a combined top and bottom view of a fitting bush of the embodiment shown in FIGS. 9 and 10.

In the embodiment of FIGS. 9 to 11, nozzles 11 (one of which is indicated) are joined to the flow transfer point 36 by means of a fitting bush 67 each that may comprise two bevels 72 for close packing of neighboring hot runner components such as further nozzles. Tapped holes 71 serve to receive screws 70 for fixing the fitting bushes 67 within casing 12—preferably in its cold condition—so that the cast body 30 is exactly positioned in bore 14. Thus allowance is made for thermal expansion or shrinkage between the flow tube 32 and the fitting bush 67 without detriment to the sealing. A strong radial support 65 for cast body 30 is located opposite to the flow outlet 36. As an additional seal, the fitting bush 67 may comprise a ring groove 73 holding a metal 0-ring at the face directly engaging the flow tube 32 (FIGS. 9 and 10).

It will be realized that the invention permits numerous deviations from the preceding description. However, a preferred hot runner system (10) for injection molding comprises a block-shaped manifold casing (12) having at least one bore (14) for facewise insertion of a cartridge-like unit (16) containing a material flow tube (32) enclosed by a heating device (38), e.g. an electric coil, and by a thermoconductive casting (V). Opposite flow transfer openings (35, 36), there are radial supports (40) protruding over the outer diameter (D) of the cast body (30) with an engaging face that is recessed relative to the bore (14), may be plane and serves for form-fit to other components such as nozzles (11), further units (16), additional flow tubes (32), etc. Supporting elements for the cast body (30) are symmetrically arranged in either axial direction to form hollow compartments; they include thermoresistant thin spiders (49), ribs (50), supporting segments (51) and preferably tube-type studs (68). Axial abutting members (18, 19) provide for tight closure of the hot runner system (10).

Essential advantages of the invention are due to the novel and clear-cut design that warrants identical thermal conditions in operation at every flow transfer point 35, 36. On either side thereof, the same number of coil windings or the same arrangement of identical heating devices 38 can be accommodated. It should also be noted that the inner hot runner tube 32 enclosing the main runner 34 need not have clamped ends. Moreover, the symmetrical design is especially advantageous in that the hot runner distributing system is in full hydraulical balance whereby series arrays can be closely packed in a comparatively small volume, using a basically similar structure with a flow tube 32 of larger inner diameter which offers space for two or more main runners 34.

While preferred embodiments have been illustrated and explained hereinabove, it should be understood that many variations and modifications will be apparent to one skilled in the art without departing from the principles of the invention which, therefore, is not to be construed as being limited to the specific forms described.

I claim:

1. A hot runner apparatus (10) for injection molding, including a block-shaped manifold casing (12) with at least one bore (14) for receiving a cartridge unit (16), said cartridge unit comprising a material flow tube (32) having flow transfer openings (35, 36), an electric heating device (38) enveloped by a thermoconductive casting (V) so that a closed cast body (30) is formed, radial supports (40) in regions adjacent to the flow transfer openings (35, 36) extending outwardly from the flow tube (32), said supports (40) each having an engaging face form-fit with surrounding components, said cartridge unit (16) being cylindrical and being adapted to be form-fitted by facewise insertion into the manifold casing (12), an insulating layer (30) encompassing the flow tube (32) and the cast body (30) being of substantially cylindrical shape and being supported within said bore (14) by a plurality of spacers (49, 50, 51), the spacers (49, 50, 51) and the radial supports (40) being thermoresistant so as to decrease heat transfer from the thermoconductive casting (V) to the casing (12).

2. Apparatus according to claim 1 wherein equal numbers of spacers (49; 60) and radial supports (40) are provided adjacent all flow transfer openings (35, 36).

3. Apparatus according to claim 2, wherein the engaging face of each radial support (40) is planar and is recessed relative to the bore (14) and wherein further radial supports are arranged symmetrically to the flow transfer openings (35, 36).

4. Apparatus according to claim 1, wherein axially extending radial segments (51) are arranged diametrically opposite to each radial support (40).

5. Apparatus according to claim 2, wherein axially extending radial segments (51) are arranged diametrically opposite to each radial support (40).

6. Apparatus according to claim 3, wherein axially extending radial segments (51) are arranged diametrically opposite to each radial support (40).

7. Apparatus according to claim 1, wherein said spacers (49, 50), for the flow tube (32) are in the form of axially spaced spiders each of which comprises at least three narrow spikes in a star configuration.

8. Apparatus according to claim 1, wherein said spacers (49) and the radial supports (40) each comprise a hub that is integral with the flow tube (32).

9. Apparatus according to claim 1, wherein radially supporting pins (68) are secured to the flow tube (32) by a set screw (69).

10. Apparatus according to claim 1, wherein the flow tube (32) is mounted by externally engaging bolts.

11. Apparatus according to claim 1, wherein the flow tube (32) is fixed without clamps at its ends.

12. Apparatus according to claim 1, wherein identical heating devices are provided on either side of a flow transfer opening (35).

13. Apparatus according to claim 1, wherein a plurality of flow outlets (36) are each equipped with a fitting bush (67) for attaching nozzles (11), each bush (67) having two bevels (72) for close packing of adjacent nozzles (11).

* * * * *